US009524428B2

(12) United States Patent
Nicholson et al.

(10) Patent No.: US 9,524,428 B2
(45) Date of Patent: Dec. 20, 2016

(54) AUTOMATED HANDWRITING INPUT FOR ENTRY FIELDS

(71) Applicant: Lenovo (Singapore) Pte. Ltd., Singapore (SG)

(72) Inventors: John Weldon Nicholson, Cary, NC (US); Scott Edwards Kelso, Cary, NC (US); Steven Richard Perrin, Raleigh, NC (US); Jianbang Zhang, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 49 days.

(21) Appl. No.: 14/263,114

(22) Filed: Apr. 28, 2014

(65) Prior Publication Data
US 2015/0310267 A1 Oct. 29, 2015

(51) Int. Cl.
*G06F 3/0488* (2013.01)
*G06F 17/24* (2006.01)
*G06K 9/00* (2006.01)
*G06K 9/20* (2006.01)

(52) U.S. Cl.
CPC ....... *G06K 9/00409* (2013.01); *G06F 3/04883* (2013.01); *G06F 17/242* (2013.01); *G06K 9/2081* (2013.01)

(58) Field of Classification Search
CPC G06F 3/30545; G06F 3/03547; G06F 3/0416; G06F 3/04883; G06F 17/21; G06K 9/00402; G06K 9/00409; G06K 9/00449; G06K 9/222
USPC .......................................... 345/173; 382/189
See application file for complete search history.

(56) References Cited

U.S. PATENT DOCUMENTS

| 4,972,496 | A | 11/1990 | Sklarew |
| 6,212,297 | B1 | 4/2001 | Sklarew |
| 6,295,372 | B1 | 9/2001 | Hawkins et al. |
| 7,564,995 | B1 * | 7/2009 | Yaeger ............... G06K 9/222 382/119 |
| 7,639,876 | B2 | 12/2009 | Clary et al. |
| 7,643,687 | B2 | 1/2010 | Jurion et al. |
| 7,751,623 | B1 | 7/2010 | Simmons et al. |
| 7,936,339 | B2 | 5/2011 | Marggraff et al. |

(Continued)

OTHER PUBLICATIONS

Stanley, Jeremy L., Non-Final Office Action for U.S. Appl. No. 14/294,560, 20 pages.

(Continued)

*Primary Examiner* — Larry Sternbane
(74) *Attorney, Agent, or Firm* — Ference & Associates LLC (57) ABSTRACT

An embodiment provides a method, including: detecting, at a surface of a device accepting handwriting input, a location of the display surface associated with initiation of a handwriting input; determining, using a processor, a location of an entry field in a document rendered on a display surface, the location of the entry field being associated with a display surface location; determining, using a processor, a distance between the location of the surface associated with initiation of the handwriting input and the location of the entry field; and automatically inserting input, based on the handwriting input, into the entry field after determining the distance is less than a threshold value. Other aspects are described and claimed.

20 Claims, 4 Drawing Sheets

(56) References Cited

U.S. PATENT DOCUMENTS

| | | |
|---|---|---|
| 8,824,785 B2 | 9/2014 | Ives et al. |
| 9,001,046 B2 | 4/2015 | Kim |
| 2002/0009226 A1* | 1/2002 | Nakao .................... G06K 9/222 382/177 |
| 2002/0060702 A1 | 5/2002 | Sugimoto et al. |
| 2002/0156846 A1* | 10/2002 | Rawat .................... G06F 17/243 709/203 |
| 2003/0214531 A1 | 11/2003 | Chambers et al. |
| 2003/0214553 A1 | 11/2003 | Dodge |
| 2005/0052434 A1 | 3/2005 | Kolmykov-Zotov et al. |
| 2005/0099407 A1 | 5/2005 | Pennington et al. |
| 2005/0223355 A1 | 10/2005 | Forstmann et al. |
| 2005/0240756 A1* | 10/2005 | Mayer .................... G06F 9/4418 713/2 |
| 2006/0071910 A1 | 4/2006 | Kim et al. |
| 2006/0101354 A1 | 5/2006 | Hashimoto et al. |
| 2006/0209042 A1 | 9/2006 | Cohen et al. |
| 2008/0122796 A1 | 5/2008 | Jobs et al. |
| 2009/0159342 A1 | 6/2009 | Markiewicz et al. |
| 2010/0090964 A1 | 4/2010 | Soo et al. |
| 2011/0292084 A1 | 12/2011 | Thomas |
| 2012/0216141 A1 | 8/2012 | Li |
| 2013/0050141 A1 | 2/2013 | Park et al. |
| 2013/0082937 A1 | 4/2013 | Liu et al. |
| 2013/0162606 A1* | 6/2013 | Araumi .................... G06F 3/041 345/179 |
| 2013/0207937 A1 | 8/2013 | Lutian et al. |
| 2013/0298071 A1 | 11/2013 | Wine |
| 2014/0019855 A1 | 1/2014 | Kim et al. |
| 2014/0108004 A1 | 4/2014 | Sternby et al. |
| 2014/0321571 A1* | 10/2014 | Karabinis ................ H04B 1/69 375/295 |
| 2014/0321751 A1* | 10/2014 | Okamoto ........... G06K 9/00402 382/189 |
| 2014/0334732 A1 | 11/2014 | Jung et al. |
| 2014/0344232 A1 | 11/2014 | Kludy |
| 2014/0354553 A1 | 12/2014 | Dai et al. |

OTHER PUBLICATIONS

Stanley, Jeremy L., Final Office Action for U.S. Appl. No. 14/294,560, Sep. 8, 2016, 34 pages.

* cited by examiner

AUTOMATED HANDWRITING INPUT FOR ENTRY FIELDS

BACKGROUND

Devices are capable of accepting handwriting inputs as a user input modality. For example, tablets, notebook computers, smart phones, laptop computers, etc., often are equipped with a surface, e.g., a display surface such as a touch screen display, which also accepts handwriting inputs. A handwriting input sub-system accepts user inputs, e.g., from a pen, stylus or even a finger tip, and interprets them into an appropriate format.

Commonly these handwriting inputs may be left in graphics form (i.e., left in handwritten form) for insertion into a document or the handwriting inputs may be converted to machine text, e.g., rendered in an optical character recognition-like procedure to fonts available to a particular application, e.g., word processing application, email application, portable document format application, etc. Therefore a user may provide handwriting inputs to many different applications, e.g., text based application, drawing applications, etc.

Certain devices now allow users to provide handwriting inputs into entry fields, e.g., text entry fields in forms. To do so, a user typically selects the entry field (e.g., with a stylus) and thereafter proceeds to provide the handwriting input, which is thereafter inserted into the entry field by the device's handwriting sub-system. Often, as described herein, the handwriting input is formatted into machine text for entry.

BRIEF SUMMARY

In summary, one aspect provides a method, comprising: detecting, at a surface of a device accepting handwriting input, a location of the display surface associated with initiation of a handwriting input; determining, using a processor, a location of an entry field in a document rendered on a display surface, the location of the entry field being associated with a display surface location; determining, using a processor, a distance between the location of the surface associated with initiation of the handwriting input and the location of the entry field; and automatically inserting input, based on the handwriting input, into the entry field after determining the distance is less than a threshold value.

Another aspect provides an apparatus, comprising: an input device that accepts user handwriting input; a display; a processor operatively coupled to the display and the input device; and a memory that stores instructions executable by the processor to: detect, at the display surface, a location of the display surface associated with initiation of a handwriting input; determine a location of an entry field in a document rendered on the display surface, the location of the entry field being associated with a display surface location; determine a distance between the location of the surface associated with initiation of the handwriting input and the location of entry field; and automatically insert the handwriting input into the entry field after determining the distance is less than a threshold value.

A further aspect provides a computer program product, comprising: a storage device having code stored therewith and executable by a processor, the code comprising: code that detects, at a display surface of a device accepting handwriting input, a location of the display surface associated with initiation of a handwriting input; code that determines, using a processor, a location of an entry field in a document rendered on the display surface, the location of the entry field being associated with a display surface location; code that determines, using a processor, a distance between the location of the surface associated with initiation of the handwriting input and the location of entry field; and code that automatically inserts the handwriting input into the entry field after determining the distance is less than a threshold value.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When providing handwritten input, it is a desirable user experience to not have to manually indicate to the system to which entry field the input should be sent to or inserted in. The SAMSUNG GALAXY NOTE 3 device provides a mechanism for writing anywhere on the screen to provide input to the system, instead of being constrained to a box at the bottom of the screen. However, with such devices the user must still manually indicate (i.e., by touching) the entry field to which the recognized characters are to be sent/inserted. GALAXY NOTE 3 is a registered trademark of Samsung in the United States and other countries.

An embodiment instead determines automatically the intended entry field based on the location of the handwriting input or portion thereof, e.g., the point at which the handwriting input is initiated. For example, an embodiment may detect that the handwriting input is intended for insertion into the entry field above which the user starts writing, e.g., using Euclidean distance to the left edge of the entry field. For example, this detection may occur automatically and provide for automated targeting of insertion for a user that has started their handwriting stroke within a threshold distance of the left edge of the entry field.

An embodiment also provides several mechanisms for the users to continue entering handwriting input into the same entry field even if they have had to "wrap" their handwriting input to the next line, e.g., even if there is a different entry field underneath (below) this next line. This may be achieved through a variety of mechanisms.

For example, an embodiment may employ a time threshold. By way of example, once the user has stopped handwriting input momentarily and exceeding the operative time threshold, the handwritten input is recognized as completed, converted to text, and sent to the appropriate entry field.

An embodiment may also employ position on screen with respect to the handwriting input. For example, if the user has "wrapped" to the next line, even though there was plenty of room on the previous line (i.e., in the first or initial entry field), an embodiment may determine that the user is more likely to be moving on to the next entry field and thus process insertion of this handwriting into the next entry field accordingly.

An embodiment may also employ a language model. For example, if it seems that the handwriting input has stalled mid-thought or mid-sentence, an embodiment may defer translating the handwriting into text for an additional time threshold. This is useful if the user pauses to think of what to write next, triggering the time threshold mentioned above. This is possible via use of a language model to detect incomplete sentences or commonly used phrases, etc.

Note that the entry field positions may be detected periodically, and not assumed to be static, as certain documents are dynamic and this may result in movement (with respect to screen location and thus handwriting input location). This may be important for example when an entry field pops into existence (perhaps after a button press, or server response received, etc.), or when a multi-line field grows, etc.

The illustrated example embodiments will be best understood by reference to the figures. The following description is intended only by way of example, and simply illustrates certain example embodiments.

Figure 1:
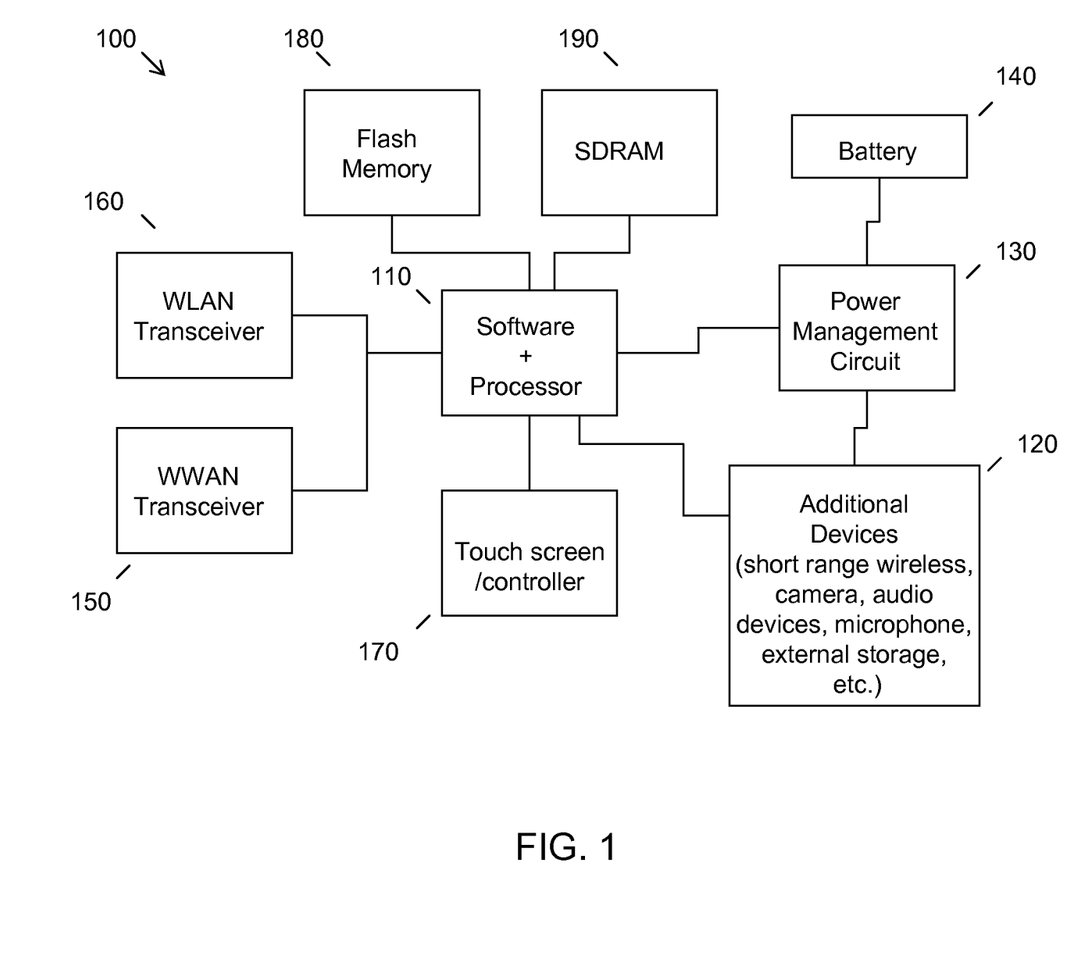
FIG. 1 illustrates an example of information handling device circuitry.

While various other circuits, circuitry or components may be utilized in information handling devices (also referred to herein as apparatuses, electronic devices, or simply devices), with regard to smart phone and/or tablet circuitry 100, an example illustrated in FIG. 1 includes a system on a circuit design found for example in tablet or other mobile computing platforms. Software and processor(s) are combined in a single circuit 110. Processors comprise internal arithmetic units, registers, cache memory, busses, I/O ports, etc., as is well known in the art. Internal busses and the like depend on different vendors, but essentially all the peripheral devices (120) may attach to a single circuit 110. The circuitry 100 combines the processor, memory control, and I/O controller hub all into a single circuit 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single circuit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. System 100 often includes a touch screen 170 for data input and display/rendering, for example as may be used in detecting handwriting inputs. System 100 also typically includes various memory devices, for example flash memory 180 and SDRAM 190.

Figure 2:
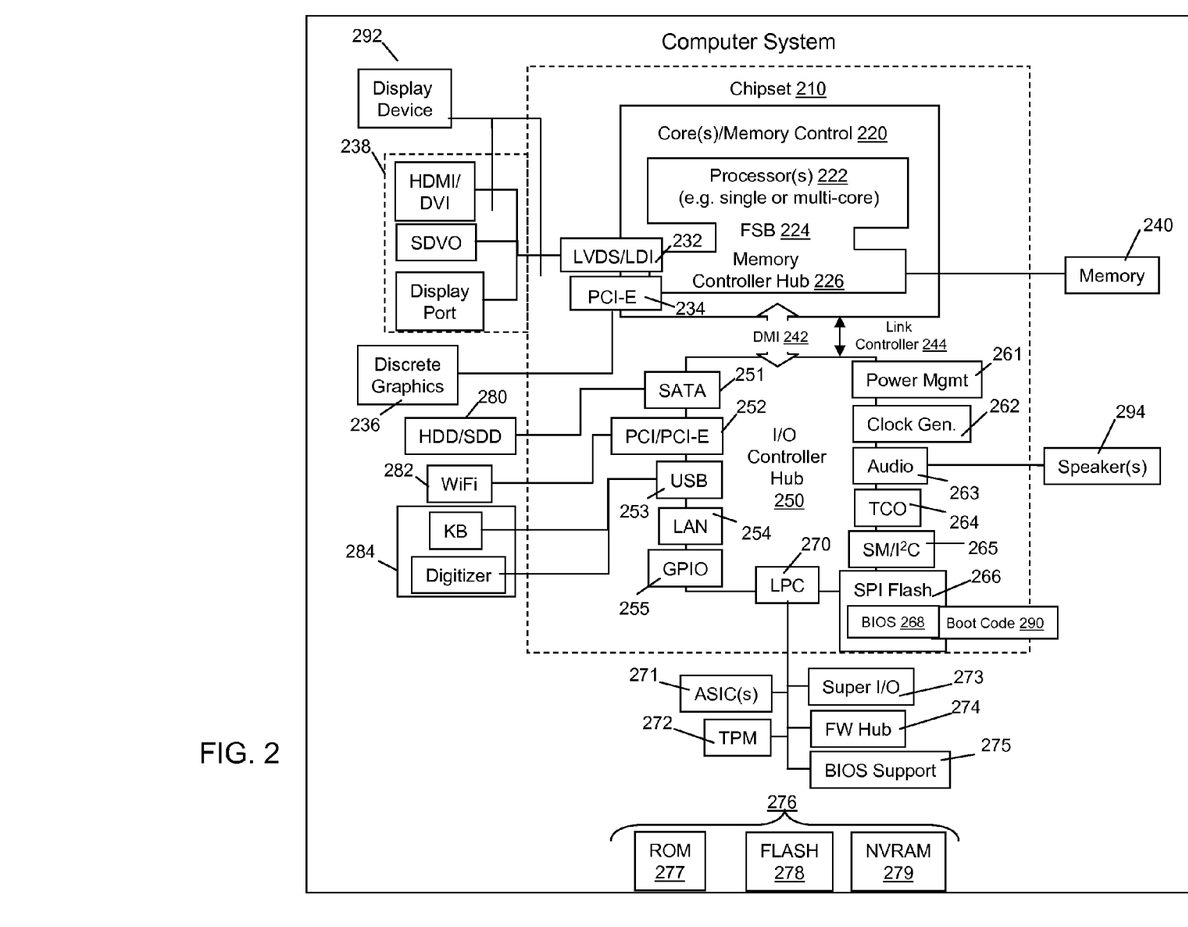
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Circuitry, as for example outlined in FIG. 1 or FIG. 2, may be used in devices that support handwriting input interfaces. For example, circuitry as outlined by way of example in FIG. 1 and FIG. 2 may be used in devices that accept handwriting input via a touch screen display.

Figure 3:
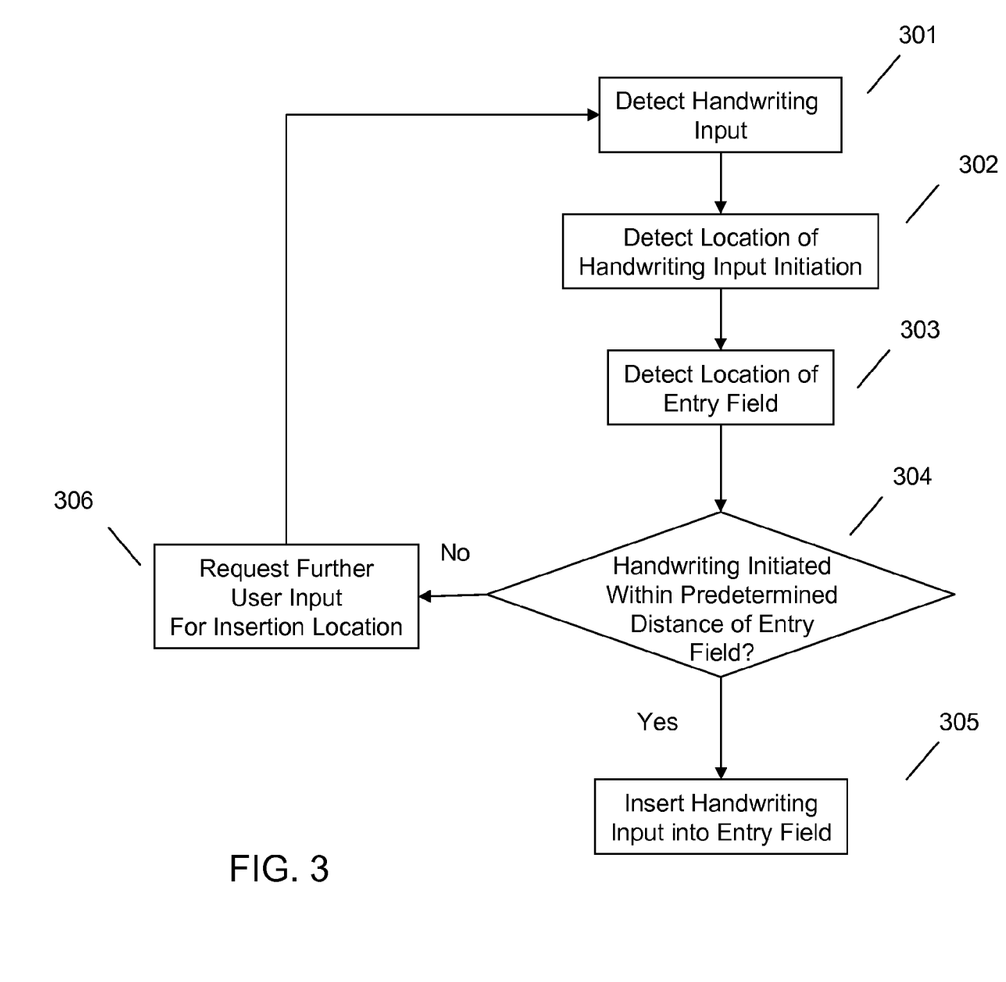
FIG. 3 illustrates an example method of automated handwriting input for entry fields.

Referring to FIG. 3, an example method of automated handwriting input for entry fields is illustrated. An embodiment may detect at 301 a handwriting input at a display surface, e.g., detecting at a touch screen a stylus handwriting input has occurred. Moreover, an embodiment may also determine at 302 that the handwriting input has been initiated at a particular location of the display surface, e.g., at a particular x, y location on the touch screen.

An embodiment may determine at 303 a location of an entry field in a document rendered on the display surface, the location being associated with a display surface location of an entry field. For example, an embodiment may access information, e.g., derived from the document structure available via the operating system, a location of a particular entry field and/or sub-portion thereof, e.g., a left edge of an entry field with respect to x, y coordinates within the touch screen. Given this location information regarding where the handwriting input was initiated or started and the location of an entry field, an embodiment thus may determine at 304 if a distance between the location of the surface associated with initiation of the handwriting input and the location of the entry field is within a given distance, e.g., within a predetermined threshold.

If so, an embodiment may determine or infer that the handwriting input should be automatically inserted into the entry field at 305. Otherwise, an embodiment may request further user input to confirm or identify an insertion location for the handwriting input at 306.

It will be understood that, depending on the nature of the entry field proximate to the handwriting input, the handwriting input may or may not be automatically converted into machine text for entry into the field. This converting may occur prior to the inserting of the handwriting input into the entry field.

An embodiment facilitates convenient automated insertion by intelligently determining if the handwriting input has completed, such that the determination that the handwriting input has completed occurs prior to the inserting the handwriting input into the entry field. This accommodates users that may pause while providing handwriting input as well as users that may need more space to provide the handwriting input, e.g., more space than is provided by a single text entry field.

Figure 4:
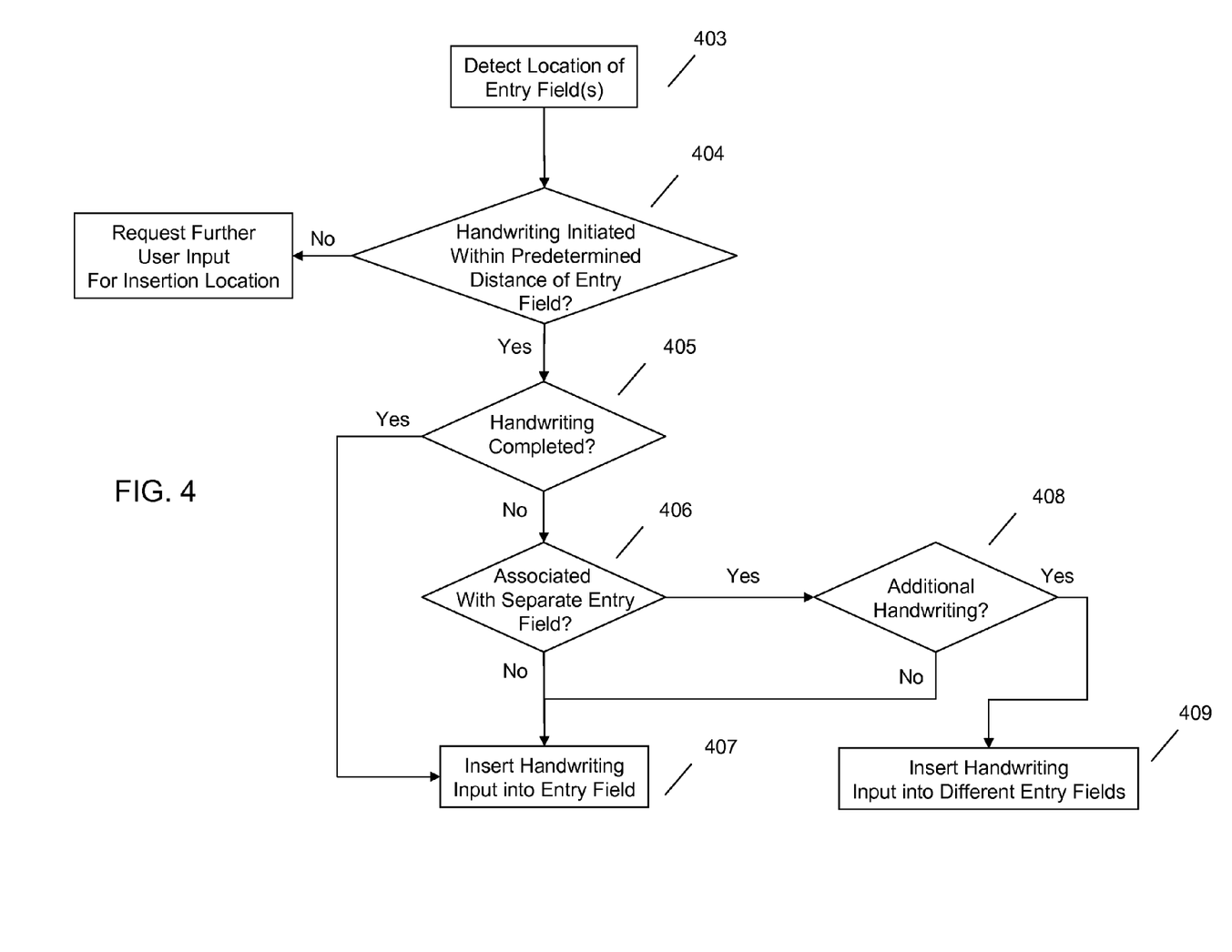
FIG. 4 illustrates another example method of automated handwriting input for entry fields.

Referring to FIG. 4, a variety of mechanisms may be used by an embodiment to determine that the handwriting has completed and/or should be inserted into an entry field. As illustrated in the example of FIG. 4, using a detection of the location of the entry field(s) at 403, an embodiment may determine if a field is within a predetermined distance of the input at 404. If so, an embodiment may proceed to determine if the handwriting has completed at 405, e.g., using a predetermined time threshold, a predetermined distance threshold, a language model, a combination of factors, etc., as further described herein.

For example, the determining that the handwriting input has completed at 405 may include detecting a time greater than a predetermined threshold has elapsed since a last handwriting input. The determining that the handwriting input has completed at 405 may include detecting at 406 that a display surface location associated with a separate entry field has been utilized to provide additional handwriting input 408. In this case, for example, if the display surface location associated with a separate entry field is closer to the additional handwriting input than the initial entry field, and the additional handwriting input would have fit within the initial entry field, an embodiment may determine that this additional handwriting input is in fact separate handwriting input and that the first handwriting input has been completed. If not, an embodiment may of course insert the input into the initial entry field at 407.

As another example, the determining that the handwriting input has completed at 405 may include detecting that language of the handwriting input and additional handwriting input detected at 408 provided to another display surface location are not associated with one another according to a language model. In other words, an embodiment may determine that a language model does not suggest that initial handwriting input and additional handwriting input belong together, e.g., as completion of a phrase or sentence, thus allowing a determination that the handwriting inputs should be processed separately for separate insertion into different entry fields at 409. Likewise, an embodiment may use a language model to positively associate handwriting inputs together such that they are treated as a unit or single handwriting input event, which would lead to a determination that the additional handwriting input, e.g., separated in time from the initial handwriting input, is actually a continuation of the initial handwriting input for field entry purposes.

As will be readily understood from the foregoing, one or more of the techniques may be combined to determine if handwriting input has completed or is being continued, e.g., after a pause or within another entry field. Each of the thresholds, e.g., time, distance to an entry field, etc., may be modified dynamically, e.g., using reference to a user history or modified manually by a user. This permits an embodiment to facilitate continuous or automatic insertion of handwriting inputs into entry fields without burdening the user with manually indicating which entry field the text is intended for. Naturally, if an embodiment is unable to make an inference with respect to the appropriate entry field, with respect to completion of the handwriting, etc., an embodiment may prompt the user for further input or confirmation.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, using a processor, at a surface of a display device, a location of the surface associated with initiation of a handwriting input;
   wherein a location of an entry field in a document displayed on the surface, is associated with a surface location;
   automatically inserting, using the processor, input into the entry field based on a distance between the location of the surface associated with initiation of the handwriting input and the location of the entry field;
   determining, using the processor, that the handwriting input has completed: and
   thereafter, using the processor, inserting additional handwriting input into a separate entry field associated with a surface location of the additional handwriting input after detecting that the separate entry field includes space accommodating the additional handwriting input.

2. The method of claim 1, further comprising converting the handwriting input into machine text;
   wherein the machine text is inserted into the entry field.

3. The method of claim 1, further comprising determining that the handwriting input has completed;
   the determining that the handwriting input has completed occurring prior to the insertion of the input into the entry field.

4. The method of claim 3, wherein the determining that the handwriting input has completed comprises determining, based on a language model, that the additional handwriting input is not associated with the handwriting input.

5. The method of claim 3, wherein the determining that the handwriting input has completed comprises detecting that a surface location associated with the separate entry field has been utilized to provide the additional handwriting input.

6. The method of claim 5, wherein the surface location associated with the separate entry field is closer to the additional handwriting input than the entry field.

7. The method of claim 6, wherein the determining that the handwriting input has completed comprises determining the separate entry field includes space accommodating the additional handwriting input.

8. The method of claim 3, wherein the determining that the handwriting input has completed comprises:
   detecting a time greater than a predetermined threshold has elapsed since a last handwriting input; and
   detecting that the surface location associated with the separate entry field has been utilized to provide the additional handwriting input.

9. The method of claim 3, wherein the determining that the handwriting input has completed comprises detecting that language of the handwriting input and the additional handwriting input provided to another surface location are not associated with one another according to a language model.

10. The method of claim 3, wherein the determining that the handwriting input has completed comprises:

detecting a time greater than a predetermined threshold has elapsed since a last handwriting input;

detecting that a surface location associated with the separate entry field has been utilized to provide the additional handwriting input; and detecting the language of the handwriting input and the additional handwriting input are not associated with one another according to a language model.

11. The method of claim 1, further comprising determining that the handwriting input has not completed based on detecting that language of the handwriting input and the additional handwriting input are associated with one another according to a language model.

12. An apparatus, comprising:
a display;
a processor operatively coupled to the display; and
a memory that stores instructions executable by the processor to:
detect, at a surface of the display, a location of the surface associated with initiation of a handwriting input;
wherein a location of an entry field in a document displayed on the surface is associated with a surface location;
automatically insert the handwriting input into the entry field based on a distance between the location of the surface associated with initiation of the handwriting input and the location of the entry field;
determine that the handwriting input has completed; and
thereafter insert additional handwriting input into a separate entry field associated with a surface location of the additional handwriting input after detecting that the separate entry field includes space accommodating the additional handwriting input.

13. The apparatus of claim 12, wherein the instructions are further executable by the processor to convert the handwriting input into machine text;

wherein conversion of the handwriting occurs prior to insertion of the handwriting input into the entry field.

14. The apparatus of claim 12, wherein the instructions are further executable by the processor to determine that the handwriting input has completed;
wherein determining that the handwriting input has completed occurs prior to inserting the handwriting input into the entry field.

15. The apparatus of claim 14, wherein determining that the handwriting input has completed comprises detecting a time greater than a predetermined threshold has elapsed since a last handwriting input.

16. The apparatus of claim 14, wherein determining that the handwriting input has completed comprises detecting that the surface location associated with the separate entry field has been utilized to provide the additional handwriting input.

17. The apparatus of claim 16, wherein the surface location associated with the separate entry field is closer to the additional handwriting input than the entry field.

18. The apparatus of claim 17, wherein determining that the handwriting input has completed comprises detecting that the additional handwriting input fits within the separate entry field.

19. The apparatus of claim 14, wherein determining that the handwriting input has completed comprises:
detecting a time greater than a predetermined threshold has elapsed since a last handwriting input; and
detecting that the surface location associated with the separate entry field has been utilized to provide the additional handwriting input.

20. The apparatus of claim 14, wherein determining that the handwriting input has completed comprises detecting that language of the handwriting input and the additional handwriting input are not associated with one another according to a language model.

* * * * *